UNITED STATES PATENT OFFICE.

ANTOINE MOUNEYRAT, OF PARIS, FRANCE.

ORGANIC ARSENO-PHOSPHORUS COMPOUNDS AND PROCESS OF MAKING SAME.

1,232,373.  Specification of Letters Patent.  Patented July 3, 1917.

No Drawing.  Application filed February 16, 1915.  Serial No. 8,666.

*To all whom it may concern:*

Be it known that I, ANTOINE MOUNEYRAT, a citizen of the Republic of France, and resident of Paris, France, (post-office address 17 Rue Soufflot, Paris, France,) have invented new and useful Organic Arseno-Phosphorus Compounds and Processes of Making Same, which process is fully set forth in the following specification.

This invention relates to processes for the preparation of para-hydroxy-meta-nitrophenyl-arsinic acid and some of its derivatives.

Heretofore para-hydroxy-meta-nitrophenyl-arsinic acid, the formula of which is

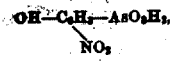

graphically written

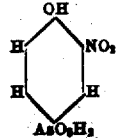

has been prepared by substituting, by diazotization, for the amino group ($NH_2$) of para-aminophenyl-arsinic acid, formula:

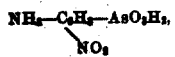

graphically written

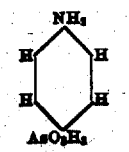

the hydroxyl group (OH), and by the subsequent nitration of the para-hydroxy-phenyl-arsinic acid thus obtained, formula:

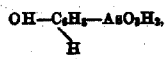

graphically written

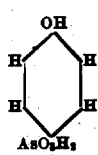

(German Patents No. 205449 of April 25, 1906, and No. 224953 of June 10, 1909.)

The present invention has for its object to provide a new method of preparing para-hydroxy-meta-nitrophenyl-arsinic acid by starting, not with para-aminophenyl-arsinic acid, but with paramethoxyphenylarsinic acid, ($CH_3O-C_6H_4-AsO_3H_2$), graphically written

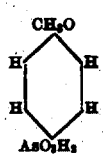

The latter acid has been obtained for the first time by Michaelis, (Liebig's "*Annalen der Chemie und Pharmacie,*" vol. 320, pp. 299–300). To accomplish the desired object with this acid, the said acid is nitrated in order to obtain the paramethoxy-meta-nitrophenyl-arsinic acid

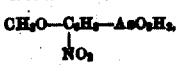

graphically written

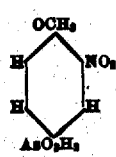

owing to the presence of the nitro group ($NO_2$) when the latter molecule is heated with an aqueous solution of caustic soda or potash, the methyl group is readily replaced by an atom of hydrogen, according to the following equation:—

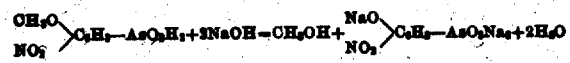

It is sufficient to acidify with hydrochloric acid in order to obtain para-hydroxy-meta-nitrophenyl-arsinic acid, formula

graphically written

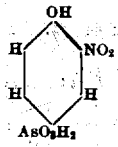

By reducing the latter acid with hydrosulfite of soda, the same amino compound is obtained as when starting with parahydroxy-meta-nitrophenyl-arsinic acid prepared by means of para-aminophenyl-arsinic acid.

By reducing para-hydroxy-meta-nitrophenyl-arsinic acid with an amalgam of sodium dissolved in an alcoholic solution, (or with cold hydrosulfite of soda), (German Patent No. 224953 of June 10, 1909), para-hydroxy-meta-aminophenyl-arsinic acid of the following composition has been obtained:—

It has now been found that the latter acid can be obtained much more readily by the electrolytic reduction of an alkaline aqueous solution of para-hydroxy-meta-nitrophenyl-arsinic acid; and it has also been found that by the action of oxy-chlorid of phosphorus on para-hydroxy-meta-aminophenyl-arsenic acid, arseno-phosphorus derivatives are obtained, the arsinic radicals of which are slightly toxic and possess a great spirillicidic and trypanosomicidic action.

*Example I.*

Preparation of paramethoxymetanitrophenylarsinic acid.

11.6 grams of methoxyphenylarsinic acid are dissolved at 0° C. in 57.5 grams of pure sulfuric acid; to this mixture, which is maintained at 0° C., there is added, in small portions, a mixture of 5.1 grams of 60% nitric acid and 5 grams of pure sulfuric acid, also at 0° C. When the two solutions have been well mixed, the vessel containing them is removed from the refrigerating apparatus, and the temperature is allowed to rise to 10 or 12° C.; it is then poured into 200 cubic centimeters of ice water. After remaining at rest for ten hours in a cold state, it is filtered in order to separate the crystals of nitro-methoxyphenylarsinic acid which are formed. This acid appears in the form of yellowish-white crystals, hardly soluble in cold water, more soluble in hot water, slightly soluble in methyl alcohol, soluble in alkaline solutions giving slightly yellowish salts. These crystals deflagrate, when heated on platinum foil.

Ethoxy-nitrophenyl-arsinic acid, formula

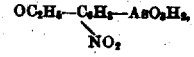

graphically written

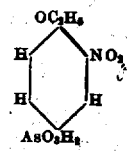

is prepared in a similar manner.

*Example II.*

Preparation of para-hydroxy-meta-nitrophenyl-arsinic acid by starting with paramethoxymetanitrophenylarsinic acid.

A solution consisting of 10 grams of methoxynitrophenylarsinic acid dissolved in 300 cubic centimeters of 15% aqueous soda solution is heated in a water bath. The solution, which is colorless at the beginning, assumes a yellow to dark red color as the heating goes on, and at the end of 5 to 6 hours the reaction is finished. The solution is allowed to cool and, while cooling, hydroxy-nitrophenyl-arsinic acid is precipitated by a slight excess of hydrochloric acid. The crystals thus obtained are washed and are re-crystallized in a sufficient quantity of boiling water. Yellowish-white crystals are thus obtained, which deflagrate when heated on platinum foil; these crystals possess all the other properties of para-hydroxy-meta-nitrophenyl-arsinic acid.

*Example III.*

Preparation of para-hydroxy-meta-aminophenyl-arsinic acid by electrolytic reduction of para-hydroxy-meta-anitrophenyl-arsinic acid in alkaline aqueous solution.

20 grams of para-hydroxy-meta-nitrophenyl-arsinic acid are dissolved in 400 cubic centimeters of normal soda. This solution is placed in a cylindrical glass receptacle having a diameter of about eight centimeters, the bottom of which is filled with mercury and connected with the negative pole of a battery of accumulators.

In said receptacle, there is suspended a porous vessel, which is closed at its lower part, and which contains an aqueous solution of soda (150 grams of soda per liter of water); and into the latter solution a blade of nickel, serving as an anode, is plunged. In order to avoid heating, the whole apparatus is immersed in a large vessel containing cold water. Under the influence of the electric current, the liquid becomes brown on contact with the mercury, and, by diffusion, the entire body of liquid assumes by and by the same coloring, the reduction being completed at the end of about five hours. It will be noted that this reduction is complete when a small portion of filtered liquid no longer gives a precipitate when treated with a slight excess of hydrochloric acid, this being a proof that no more hydroxynitrophenyl-arsinic acid is present.

Throughout the entire operation, a pressure of 3½ to 4 volts is maintained at the terminals, producing a current of 2 amperes.

The reduction being terminated, the cathodic solution is allowed to stand for twenty-four hours, the mercury is separated out, and an exact neutralization is effected by means of hydrochloric acid, taking methyl-orange as an indicator. The solution is then cooled with ice, and after having stood some time, is evaporated *in vacuo*, and the product obtained therefrom is washed with distilled water, the said product being almost pure para-hydroxy-meta-aminophenyl-arsinic acid. The acid thus prepared is chocolate brown in color; and to completely purify it, it is re-dissolved in hydrochloric acid and then treated in a heated condition, with animal black to decolorize it. The decolorized hydrochloric acid solution of hydroxy-aminophenyl-arsinic acid is then filtered and exactly neutralized with soda. In this manner, pure parahydroxymetaaminophenylarsinic acid is obtained.

It has been observed that phosphorus oxychlorid ($POCl_3$) readily reacts with parahydroxmetaaminophenylarsinic acid in the presence of an aqueous solution of soda, and produces arseno-phosphorus compounds soluble in aqueous solutions of sodium carbonate. According to the relative proportions of oxychlorid of phosphorus, sodium carbonate and hydroxy-aminophenylarsinic acid used in the operation, arseno-phosphorated compounds of different composition are obtained. By way of example, the preparation of a number of these will be given.

Example IV.

23.3 grams of aminophenyl-arsinic acid are dissolved in 300 cubic centimeters of water; 90 cubic centimeters of caustic soda at 36° Bé., and 350 cubic centimeters of 90% alcohol are added, and 27 cubic centimeters of oxychlorid of phosphorus then introduced, care being taken that the whole is suitably agitated and cooled. The liquor is neutralized by 18 cubic centimeters of caustic soda at 36° Bé., and then poured into a solution containing 1800 cubic centimeters of water, 100 grams of magnesium chlorid and 500 grams of sodium hydrosulfite. Heating then takes place for four hours at a temperature of 50° C. The precipitate which is formed, is filtered and dried *in vacuo* over sulfuric acid. The product thus obtained is a mixture of tetroxydiphosphotetraaminodiarsinobenzene and tetroxymonophosphotetraaminodiarsinobenzene, the graphical formulæ of which are, respectively,

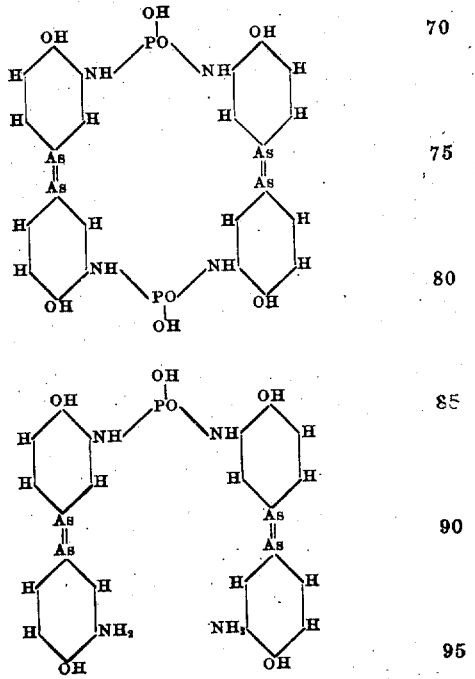

and

This is a yellow powder soluble in dilute solutions of sodium carbonate and hydrochloric acid.

The alkaline solutions reduce Fehling's solution and the re-agents of Nessler and Tollens.

In the following examples, the method is the same, but the quantities of caustic soda and oxychlorid of phosphorus vary.

Example V.

To 23.3 grams of aminophenyl-arsinic acid, are added 120 cubic centimeters of caustic soda at 36° Bé. and 36 cubic centimeters of oxychlorid of phosphorus, then 24 cubic centimeters of caustic soda at 36° Bé. are added to neutralize the liquor.

The product is a yellowish powder, soluble in solutions of sodium carbonate, and insoluble, or almost insoluble, in dilute hydrochloric acid. The solutions reduce Fehling's solution and the re-agents of Nessler and Tollens.

Example VI.

To 23.3 grams of aminophenyl-arsinic acid, are added 150 cubic centimeters of caustic soda at 36° Bé., and 45 cubic centimeters of oxychlorid of phosphorus, then 30 cubic centimeters of caustic soda at 36° Bé. are added to neutralize the liquor.

The product is a yellowish powder which dissolves in dilute solutions of sodium carbonate, and is precipitated therefrom by hydrochloric acid in which it is insoluble. Its alkaline solutions reduce Fehling's solution and the re-agents of Nessler and Tollens.

*Example VII.*

To 23.3 grams of aminophenyl-arsinic acid, are added 180 cubic centimeters of caustic soda at 36° Bé., and 54 cubic centimeters of oxychlorid of phosphorus; then 36 cubic centimeters of caustic soda at 36° Bé. are added to neutralize the liquor.

The product is a yellowish powder soluble in dilute solutions of sodium carbonate and insoluble in hydrochloric acid. Its alkaline solutions reduce Fehling's solution and the re-agents of Nessler and Tollens.

What I claim is—

1. The herein-described process for the preparation of arseno-phosphorus compounds, which comprises the treatment of aminophenyl-arsinic acid with phosphorus oxychlorid.

2. The herein-described arseno-phosphorus compounds produced by the treatment of aminophenylarsinic acid with phosphorus oxychlorid and having the form of a yellowish powder which is soluble in dilute solutions of sodium carbonate.

In testimony whereof I have signed this specification in the presence of two subscribing witnesses.

A. MOUNEYRAT.

Witnesses:
  De Witt C. Poole, Jr.,
  M. Seamlar.